Sept. 10, 1935.  G. L. R. J. MESSIER  2,013,665
REMOTE CONTROL APPARATUS
Filed May 26, 1933
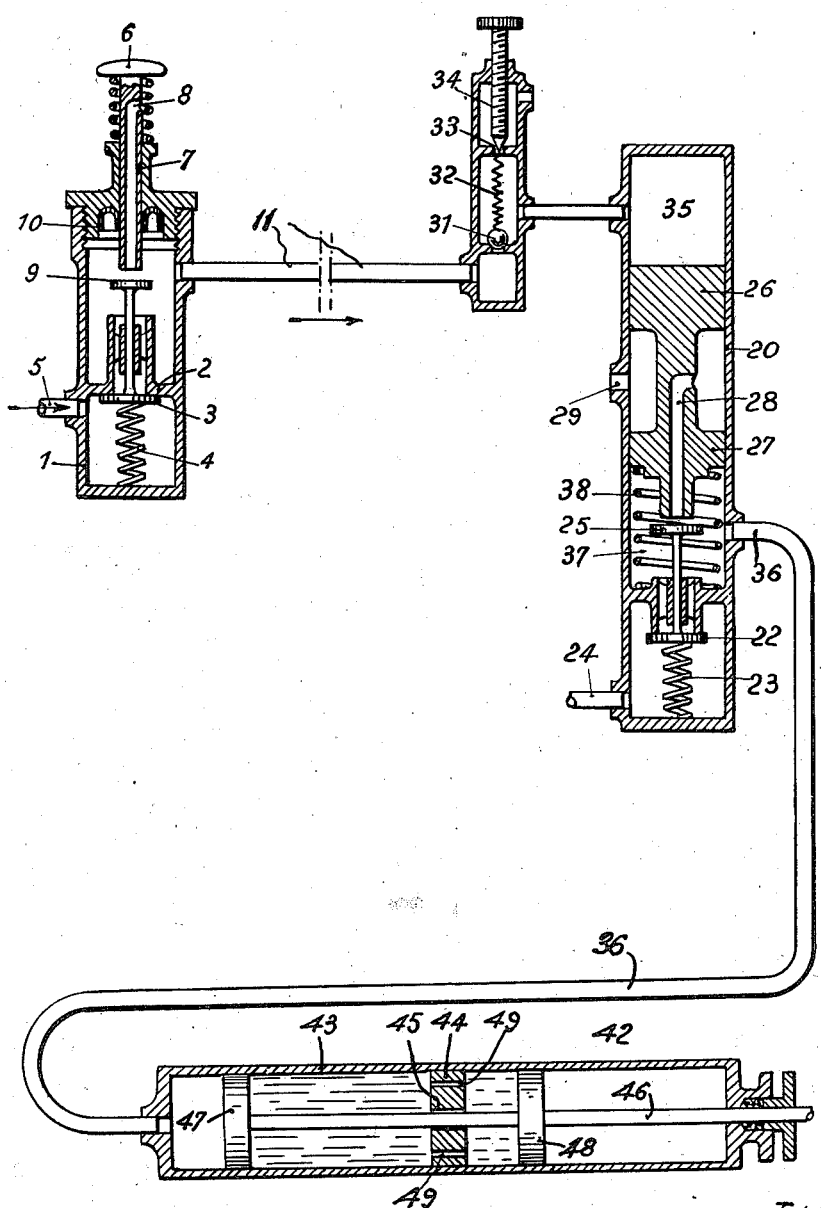
INVENTOR.
G, L, R, Jean Messier, Deceased
Y Lucie Messier, Administratrix.
By: Marks & Clerk
Attys.

Patented Sept. 10, 1935

2,013,665

UNITED STATES PATENT OFFICE 2,013,665

REMOTE CONTROL APPARATUS

George Louis René Jean Messier, deceased, late of Paris, France, by Yvonne Lucie Messier, born Bonnamy, administratrix, Paris, France Application May 26, 1933, Serial No. 673,121
In France May 27, 1932

3 Claims. (Cl. 121—38)

The present invention has for its object a remote control system particularly applicable to firing gear controls on board airplanes.

This system is applicable when the controlled movement must be effected in a definite period of time, or when the duration of the controlled movement must not depend on the time during which the control is acted upon, or again when the setting in motion of the controlled system requires a quantity of driving fluid out of proportion with that capable of being delivered by a distributing member the dimensions of which are limited by constructional requirements, for instance, the necessity of placing it on a joy-stick, control lever or similar member.

The system mainly comprises a control distributor, a regulating receiving device, and a relay.

The energy transmitting agent can be a fluid under pressure, or an electric current. The following description relates to the use of a gas under pressure; the general arrangement will be the same in case use would be made of another agent of transmission.

In its simplest form of construction, diagrammatically illustrated in section in the accompanying drawing, the system simply comprises the control distributor and receiving device.

The control distributor comprises a cylindrical body 1, divided into two chambers by a diaphragm 2, through which passes the rod of a valve 3 normally held in closed position by a spring 4.

Admission of gas under pressure coming from a pipe 5, connected to a tank or to any other source of supply, is thus normally prevented.

When depressing a knob 6 secured at the upper part of a hollow stem 7, provided with a lateral orifice 8, and entering the body 1 through a packing 10, this stem 7 is first caused to come in contact with a valve 9, then the valve 3 is caused to open. The compressed gas supplied by the pipe 5 is therefore admitted into the upper chamber of the body 1, and is conveyed, through a pipe 11, to a relay.

The relay is constituted by a cylindrical body 20 having a valve 22, a spring 23, and a valve 25, arranged as the corresponding parts 3, 4, 9 of the distributor. A hollow rod 28 connects both heads of a double piston 26, 27 controlling the downward movement of this rod.

The movement of this double piston is caused by the admission of gas under pressure (coming from the distributor 1 to 9) into the upper chamber 35 of the cylinder 20.

This gas enters the relay through a valve 31 normally held in closed position by a spring 32.

The operation then takes place as follows: depression of the knob 6, even during a very short time, causes gas under pressure to enter the compartment 35, through the valve 31, and, consequently, determines the opening of the valve 22, and the afflux of gas under pressure, admitted, through a piping 24, into a piping 36, from which it proceeds to the regulating receiving device.

The exhaust of gas under pressure from the chamber 35 takes place in the required period of time, through an orifice 33 optionally provided with a control needle valve 34. The elements 31 to 34 constitute a temporizing means.

The exhaust of gas from the chamber 35 allows the double piston 26—27 to rise under the action of the pressure existing in the compartment 37 of an optional spring 38.

The piping 36 is again put in communication with the atmosphere through the hollow rod 28 and compensating orifice 29.

The receiving device comprises a cylinder 43 divided into two compartments by a diaphragm 44 rigid with the cylinder. This diaphragm 44 is perforated with a hole 45 through which passes a rod 46 carrying two pistons 47 and 48.

The space comprised between these pistons is filled with a suitable fluid which can flow from one side of the diaphragm 44 to the other through one or more orifices 49.

The gas under pressure coming from the distributor and entering the cylinder 43 drives the rod 46, with but a slightly variable speed notwithstanding the possible variations of the pressure of the gas and of the resistance of the external system controlled by the displacement of the rod 46. In fact, any increase of speed causes a rapid increase of the resistance which is opposed to the flow of the fluid through the orifices 49, and vice versa.

When the knob 6 is no longer pressed upon, the pressure initially existing in the apparatus is reestablished, through the channel of the stem 7 and its side orifice.

The return of the movable unit 46—47—48 of the receiving device to position of rest can be effected by a spring, or manually, or in any other manner.

The packings 10, as well as those of the pistons 26 and 27 of the relay can be of any type, and particularly of the metallic bellows or diaphragm type.

In connection with the foregoing it is to be noted that since the orifice 33 is very small, the piston 26 is adapted to be actuated by the pressure when applied against the knob 6. However, after a certain time, if the pressure against the knob 6 is discontinued, the orifice 33 allows of the chamber 35 being again subjected to the atmospheric pressure.

The operation of the valve 22 is based on the fact that the chamber 37 of the valve is open to the motor cylinder and therefore is at a lower pressure than that in chamber 35.

The apparatus constituting the subject-matter of the application is generally adapted to all remote controls especially when the duration of the controlled movement must not depend on the time during which the control is acted upon. This property renders the apparatus particularly applicable to the control of the disengagement or release of gear such as torpedoes on board airplanes.

If this apparatus is used for releasing torpedoes, a control lever, not shown, is displaced by means of the hydro-pneumatic piston 17—18. This displacement which is effected in a few tenths of a second must necessarily be effected completely.

In fact, on the contrary, if the pilot should release the knob 6 too soon, he would run the risk of keeping on board the airplane a torpedo which owing to the commencement of the operation would be armed and constitute a terrible danger when landing.

The device shown in Figure 2 has the following advantage: when the knob 6 is pressed upon, a large amount of air is stored in the chamber 35 and cannot return behind owing to the closure of the valve 31. This air, which is subjected to a pressure of from 8 to 10 kilograms, takes more time for losing its pressure through the very small orifice 33 than the time for the operation of the release device.

Such a system ensures, regardless of the short time during which the knob 6 is pressed upon, a complete release of the torpedo. The term release implies the release of the torpedo in space.

What is claimed is:

1. In a remote control apparatus a manually controlled distributor, a driving agent controlled by the distributor, a receiving system, a relay valve interposed between the distributor and the receiving system and comprising a cylindrical body divided into upper and lower chambers, a double valve in the body for controlling communication between the chambers, means constantly acting on said valve in a definite direction, a double piston in the upper chamber of the body including a pair of heads and a rod connecting said heads, said rod being provided with a channel leading to the space between the heads, an inlet in the upper chamber of the body for the driving agent coming from the distributor, an inlet for lower pressure driving agent in the lower chamber of the body, an outlet for the body on the side adjacent the receiving system, an exhaust port in the body in communication with the channel in the rod at points between the heads of the double piston, and means for returning the double piston in a definite direction.

2. In a remote control apparatus a manually controlled distributor, a driving agent controlled by the distributor, a receiving system, a relay valve interposed between the distributor and the receiving system and comprising a cylindrical body divided into upper and lower chambers, a double valve in the body for controlling communication between the chambers, means constantly acting on said valve in a definite direction, a double piston in the upper chamber of the body including a pair of heads and a rod connecting said heads, said rod being provided with a channel leading to the space between the heads, an inlet in the upper chamber of the body for the driving agent coming from the distributor, an inlet for the lower pressure driving agent in the lower chamber of the body, an outlet for the body on the side adjacent the receiving system, an exhaust port in the body in communication with the channel in the rod at points between the heads of the double piston, means for returning the double piston in a definite direction, means interposed between the distributor and the relay valve permitting the passage of the fluid, coming from the distributor, toward the relay valve but prohibiting the return of the fluid backward, and means between the preceding means and the relay valve and permitting the flow of the fluid externally in a predetermined period of time.

3. An apparatus as claimed in claim 1 wherein a valve is interposed between the upper chamber of the body of the relay valve and the distributor, the casing of which is provided with an aperture opening to the atmosphere, and means for regulating the size of said aperture.

YVONNE LUCIE MESSIER, BORN BONNAMY,
*Administratrix of the Estate of George Louis René Jean Messier, Deceased.*